United States Patent [19]

Smyly, Sr.

[11] Patent Number: 5,004,260
[45] Date of Patent: Apr. 2, 1991

[54] TRAILERED BOAT CRADLE

[76] Inventor: George M. Smyly, Sr., 1903-B Carlton St., N., Charleston, S.C. 29405

[21] Appl. No.: 458,519

[22] Filed: Dec. 28, 1989

Related U.S. Application Data

[63] Continuation-in-part of Ser. No. 305,275, Feb. 2, 1989, Pat. No. 4,911,459.

[51] Int. Cl.$^5$ ............................................. B60P 3/10
[52] U.S. Cl. ............................... 280/414.1; 414/482; 414/477; 114/344
[58] Field of Search ............... 280/414.1; 414/483, 414/482, 477, 478, 479, 486, 498, 532; 114/344

[56] References Cited

U.S. PATENT DOCUMENTS 4,911,459 3/1990 Smyly, Sr. ..................... 280/414.1

Primary Examiner—David M. Mitchell
Assistant Examiner—Martin W. Gerich

[57] ABSTRACT

A boat cradle is pushed from, and pulled onto, the bed of a combined trailer by launcher and retriever cabling in combination with a reversible drum winch and a telescoping push/pull rod. Longitudinal alignment of the cradle with the bed of the trailer is maintained by a folding stabilizer assembly. If desired, a telescoping stabilizer is substituted for the folding stabilizer component of the stabilizer assembly. The cradle has a buoyant multi-wheeled boat keel support platform and hand rails. A cradled vessel is weather protected by placing conventional light weight covered framing over the cradle. Alternatively, the vessel is protected by having an enclosure installed over the combined trailer.

13 Claims, 8 Drawing Sheets

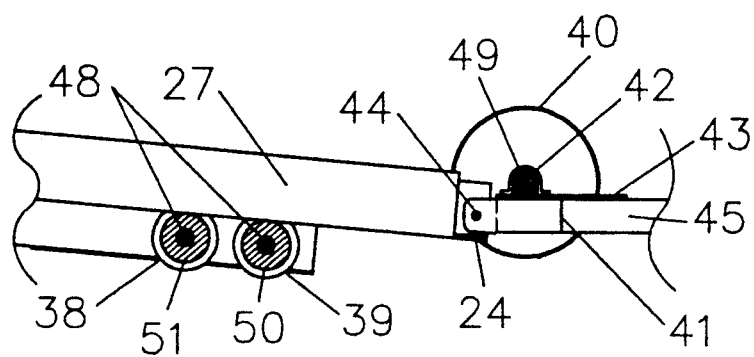
FIG. 9
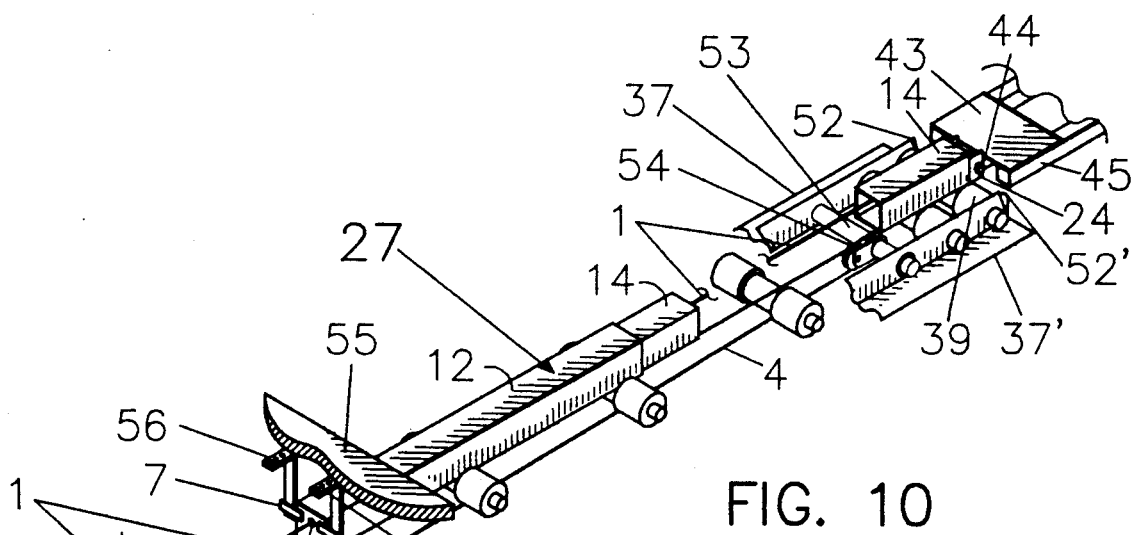
FIG. 10
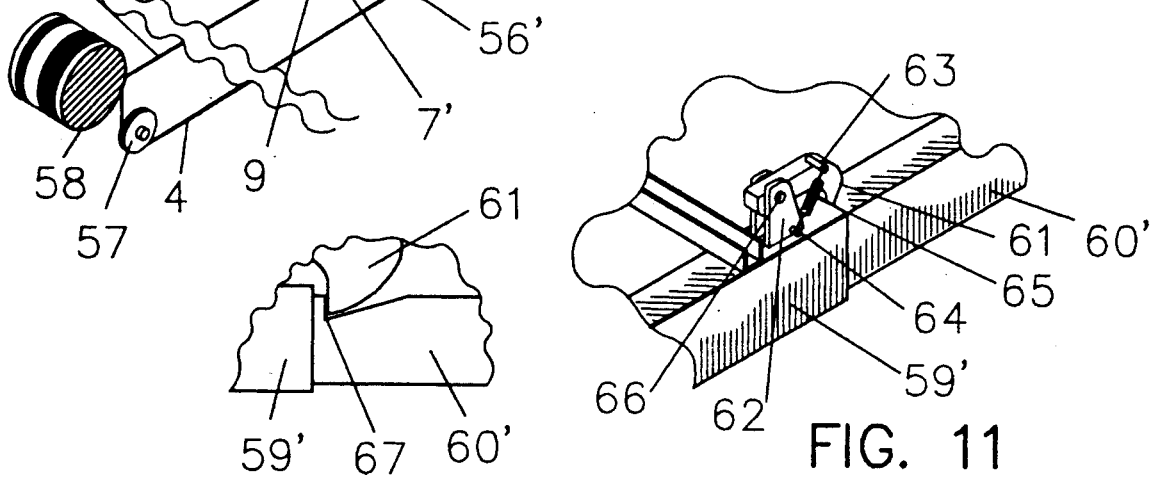
FIG. 11
FIG. 12

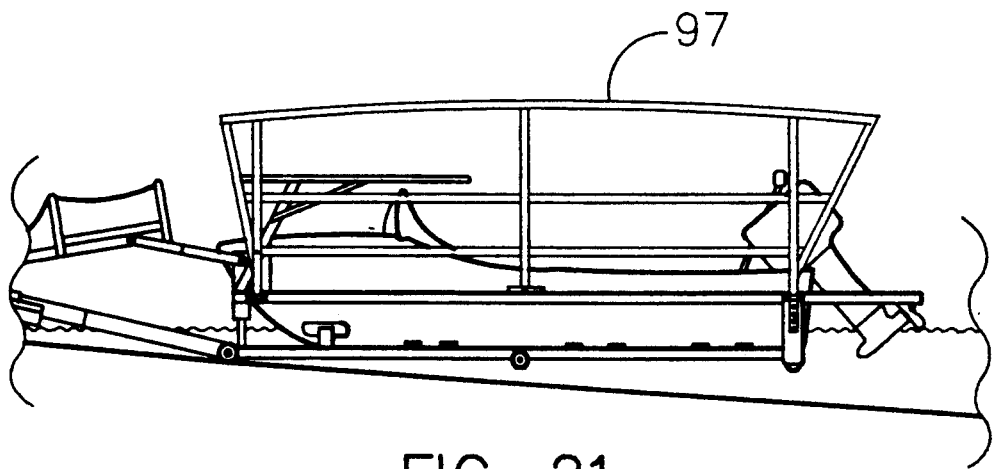
FIG. 21
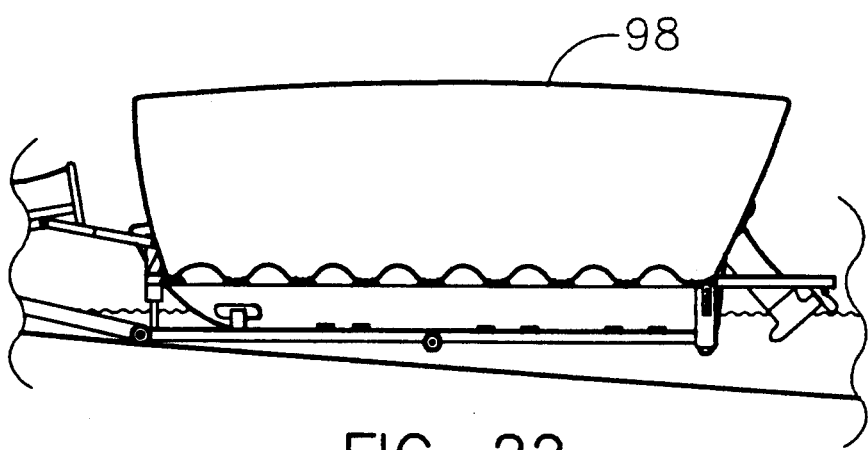
FIG. 22
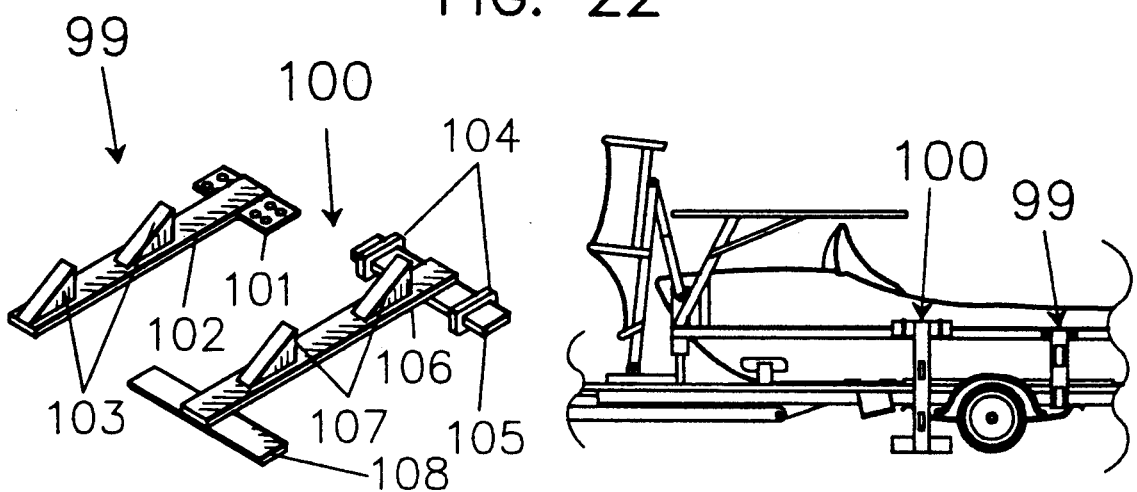
FIG. 23
FIG. 24

TRAILERED BOAT CRADLE

CROSS REFERENCE TO RELATED APPLICATIONS

This is a continuation-in-part of application Ser. No. 305,275 filed Feb. 2, 1989, (U.S. Pat. No. 4,911,459).

BACKGROUND OF THE INVENTION

1. Field of the Invention

The present invention relates to launching and recovering a boat by using a trailered launcher/retriever boat cradle. More specifically, the present invention relates to providing a more compact, easily accessible, trailered launcher/retriever boat cradle having a telescoping push/pull rod, a telescoping cradle stabilizer and a buoyant multi-wheeled boat keel support platform.

2. Prior Art

My Launcher/Retriever Cradle for Trailered Boats, U.S. Pat. No. 4,911,459, provides, for the first time ever, a method for completely separating a cradle from the bed of a trailer while maintaining the cradle longitudinally aligned with the trailer bed, a buoyed, wheeled, boat transom supporting cross tee member providing a unique method for piloting a vessel from/onto the cradle keel support platform, a slide rail secured folding stabilizer/walkway maintaining the mentioned longitudinal alignment, and a solid push/pull rod having launcher and retriever cables attached at the forward end thereof, and cables training about fore pulleys and reverse wound on the drum of a reversible drum winch.

The principle object of the present invention is to have a compact trailered boat cradle.

Another object of the present invention is to protect a cradled boat.

Another object of the present invention is to have a multi-wheeled buoyant keel support platform member of the trailered boat cradle.

Still further, an object of the present invention is to have hand rails mounted upon the boat cradle.

It is yet a further object of the present invention to have ladders for climbing aboard a cradled boat.

Finally, it is an object of the present invention to have a telescoping stabilizer as a component of the trailered boat cradle.

The foregoing objects can be accomplished by providing a telescoping push/pull rod having cables attached such that a reversible drum winch will, via the push/pull rod, push a cradle from, and then pull the same onto, the bed of a trailer. A telescoping stabilizer/walkway pivotally attached to vertical cross tee arm members of the cradle and a trailered, rail captured, sliding stabilizer platform will provide longitudinal alignment of the launched cradle with the trailer bed. Flotation material can be added to the boat keel support platform member of the cradle and additional wheels added to the same. Supported hand rails can be attached at a suitable forward area of the cradle and a light weight "I" shaped ladder can be kept convenient to the device and used for climbing aboard a cradled vessel. A light weight protective covering can be installed upon the cradle, or alternately, an enclosure can be placed over the combined trailer.

The present improvement invention will hereinafter be described in more detail and with reference to the accompanying drawings, in which:

FIG. 9 depicts a partial sectional side view, similar to FIGS. 7 and 8, showing the push/pull rod upon rollers, the understood trailer being angled, and the keel support platform somewhat extended.

FIG. 10 is a partial, cut-away perspective view of the relationships between the push/pull rod, cabling, drum of drum winch, stabilizer platform, roller supporting angle members, and the keel support platform.

FIG. 11 is an enlarged perspective view of the stop locking device shown in FIGS. 16 and 17.

FIG. 12 is an enlarged partial side view of the stop locking device shown in FIGS. 11, 16, and 17.

FIG. 21 depicts a plain side view of a cradle having a light weight framing, the framing to accommodate the covering shown in FIG. 22.

FIG. 22 depicts a plain side view of the framed cradle of FIG. 21 having a protective covering over the framing.

FIG. 23 depicts an enlarged perspective view of two types of handy step devices for use with the invention, the devices being also shown in FIG. 24.

FIG. 24 depicts a partial side view of the trailered cradle having three types of handy stepping devices.

DETAILED DESCRIPTION OF THE PREFERRED EMBODIMENTS

Figure 1:
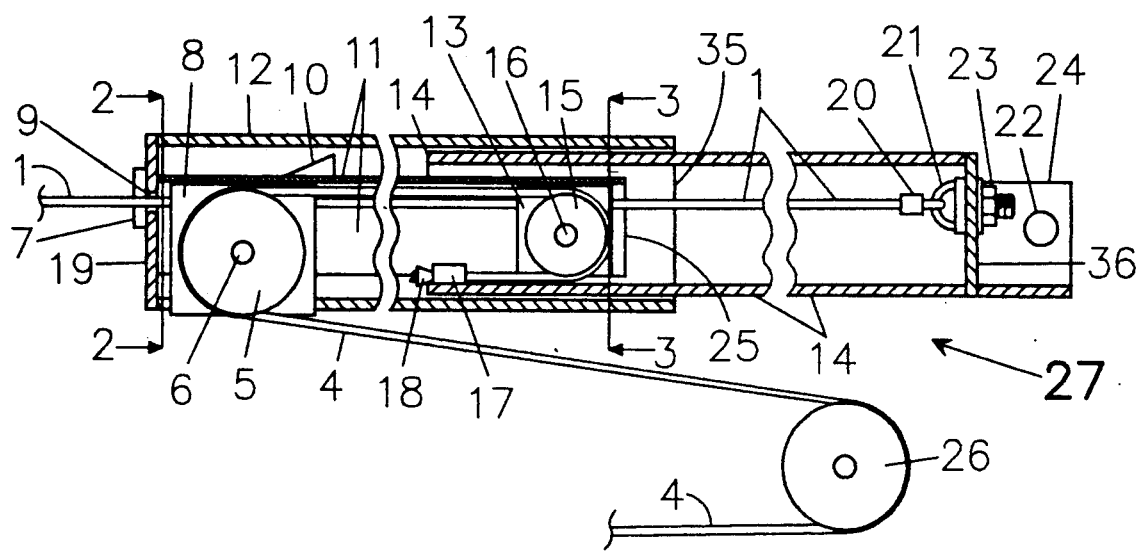
FIG. 1 depicts a partial, sectional side view of the improved telescoping push/pull rod.
Figure 2:
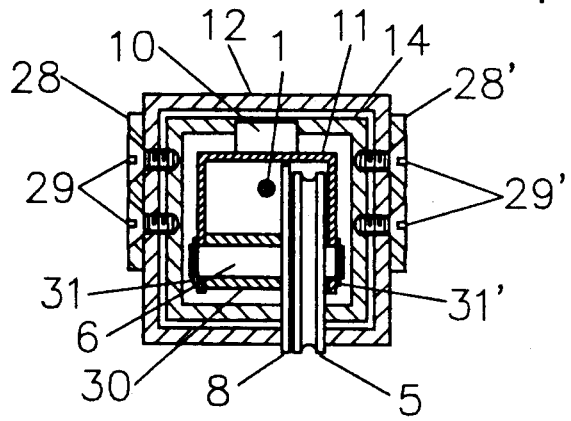
FIG. 2 depicts a sectional view of the, hereinafter understood first component, near fore end of the improved telescoping push/pull rod, taken along the line 2—2 of FIG. 1.

Referring now to the drawings, in all of which like components are designated by like reference numerals.

Viewing FIG. 1, the improved telescoping push/pull rod 27 is shown having two major components wherein the understood fore, first component 12 comprises an elongated, rectangular, or square, tubular housing 12 having a detachably secured foremost cover plate 19, an elongated, pulley shaft supporting, channel stock member 11 end welded to the central inner surface of the cover plate 19, a stop 10 welded laterally centered upon the upper surface of the channel member 11, a fore pulley 5 rotatingly secured, within the channel member 11, upon the pulley shaft 6, an aft pulley 15 rotatingly secured, within the channel member 11, upon the pulley shaft 16, and launcher cable 4 retainer plates 8 and 13. The understood aft, second component 14, having outer surfaces registrable with inner surfaces of the first component 12, comprises an elongated, rectangular, or square tubular housing 14 having the end of the launcher cable 4 passing through a cable end retainer 17, the cable retainer 17 being preferably welded to the forward, lower inner surface of the second component 14, the end of the cable 4 being retained by a preferred compression fitting 18, an aft, rectangular cover plate 36, the plate 36 preferably welded in place, a preferred heavy duty, corrosion resistant eye bolt 21 secured to the plate 36 using a corrosion resistant flat washer and nut 23. The retriever cable 1 loops the eye of the eye bolt 21 having another preferred compression fitting 20 maintaining a captured cable loop. The rearwardly protruding, laterally flush, apertured 22 plate 24, having an opposite side twin, is providing, hereinafter described, a pivotal connection point for a boat keel support platform.

Figure 3:
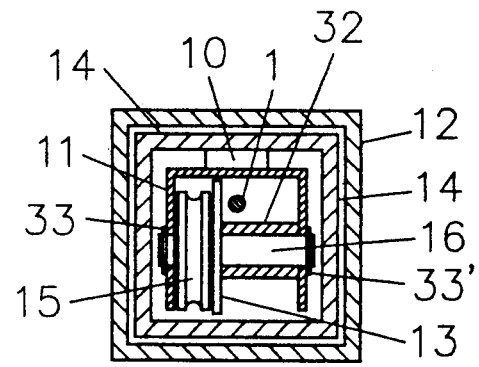
FIG. 3 is a sectional view taken along the line 3—3 of FIG. 1, omitting unnecessary items.
Figure 4:
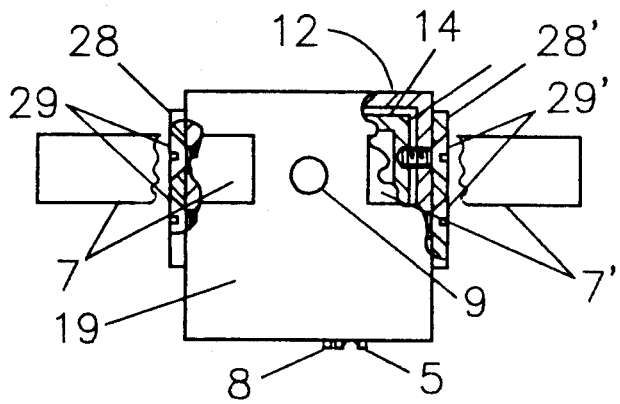
FIG. 4 depicts a cut-away, understood first component, fore end view of the telescoping push/pull rod.
Figure 5:
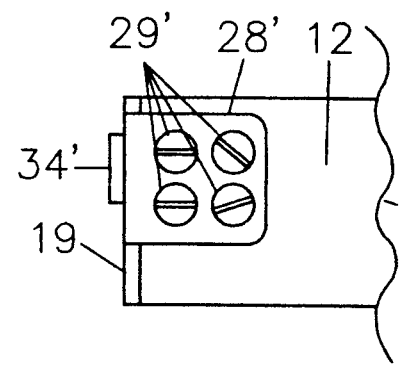
FIG. 5 is a partial side elevation view of the fore end of the first component of the telescoping push/pull rod.
Figure 6:
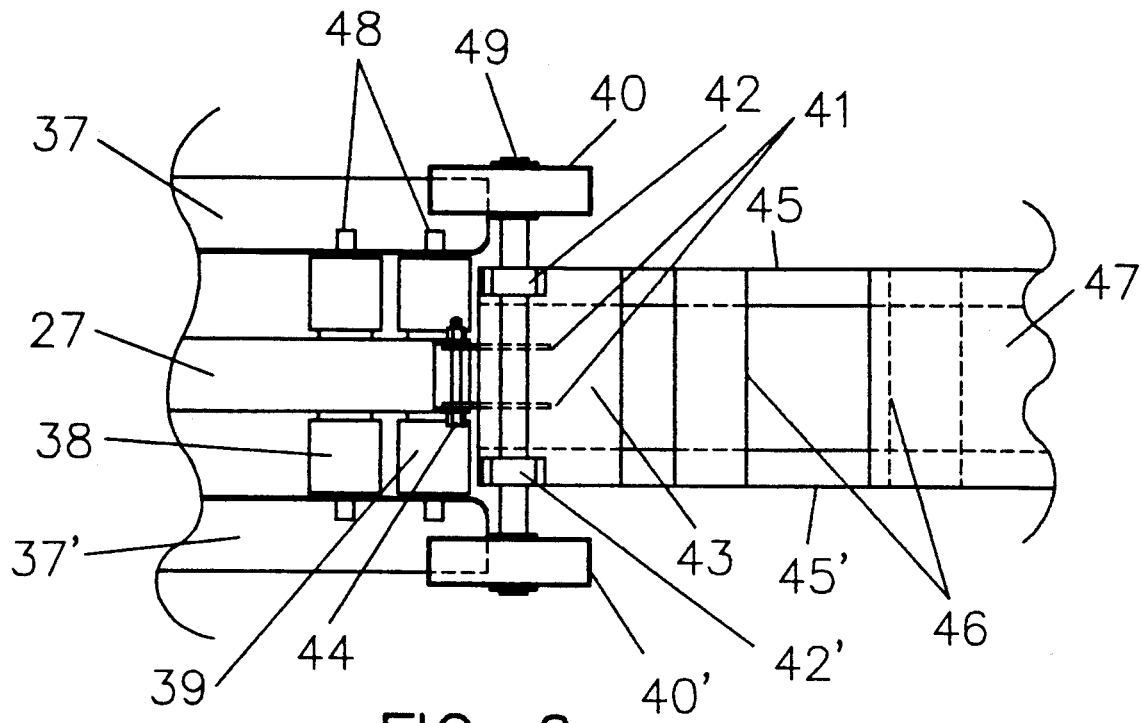
FIG. 6 depicts a partial top view of FIG. 7 and shows the relationship of the push/pull rod upon rollers, the pivot connection between the push/pull rod and keel platform, the keel platform and fore wheels, the roller supporting angle members and members of the keel support platform.
Figure 7:
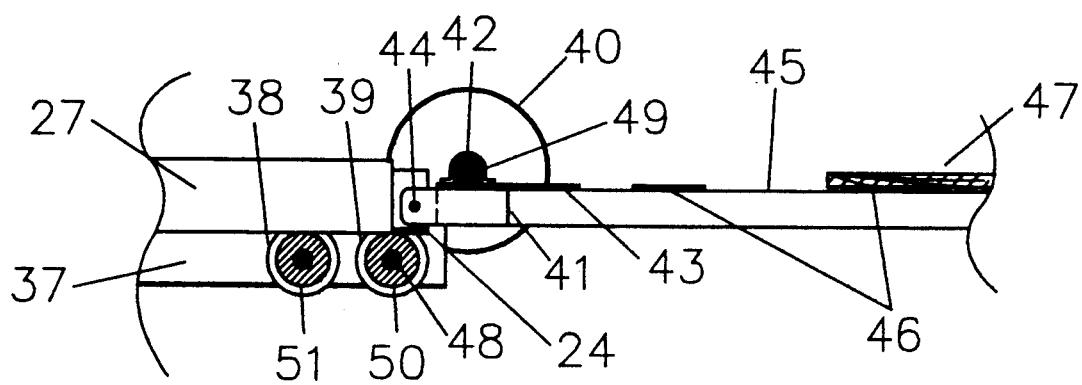
FIG. 7 depicts a partial sectional side view of FIG. 6.

Viewing FIGS. 1-5, FIG. 2 taken along the line 2—2 of FIG. 1 and FIG. 3 taken along the line 3—3 of FIG. 1, the detachably secured first component 12 cover plate 19 is shown having securing side plates 28, 28' stove bolted 29, 29' to the near fore end sides of the first component 12. The retriever cable 1, being fray protected by the rounded inner/outer edges of aperture 9, is shown passing, laterally centered, through the cover plate 19 aperture 9, between lateral side members of the channel stock 11, above the spacers 30, 32, through the second component 14, and fixedly attached at the eye of the eye bolt 21, as mentioned above. Viewing FIGS. 1, 2, 4, 5, the laterally protruding catch bars 7, 7', explained in more detail hereinafter, are preferably welded somewhat above vertical center upon the cover plate 19. Viewing FIGS. 1, 2, the first component 12 fore pulley 5 is shown rotatingly secured upon the pulley shaft 6, the shaft 6 being laterally secured within the channel stock member 11 by the preferred Truarc snap rings 31, 31'. The preferred rectangular shaped launcher cable retainer plate 8 and the pulley 5 are maintained at the shown, lateral off center, position by means of the position retaining spacer 30. Viewing FIGS. 1, 3, the first component 12 aft pulley 15, pulley shaft 16, spacer 32, launcher cable retainer plate 13, shaft locking Truarc snap rings 33, 33', are installed in a manner similar to the mentioned fore members. The two off-center positioned pulleys 5, 15 are in a coplanar relationship with each other.

Figure 13:
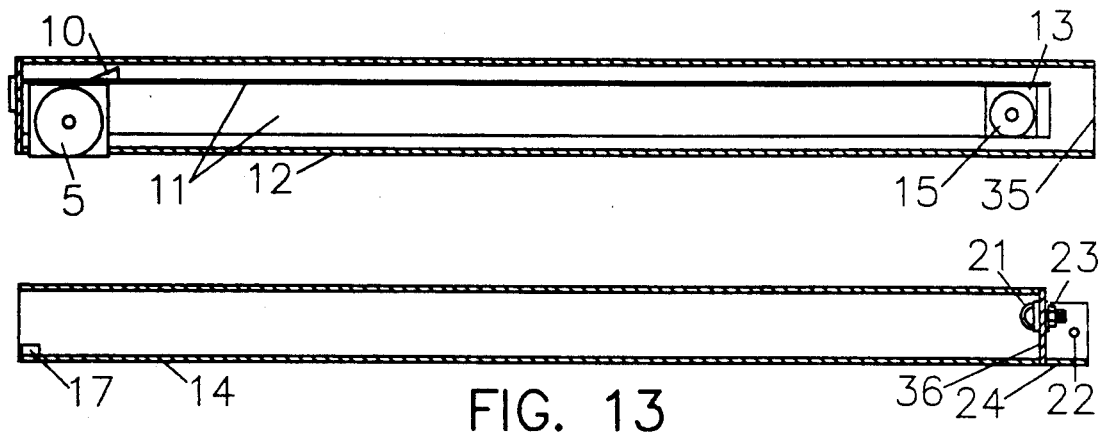
FIG. 13 is a sectional side elevation view of separated first and second components, mentioned above, of the telescoping push/pull rod.

Again, viewing FIG. 1, the channel stock 11, having the second component 14 stop 10, does not extend to the end 35 of the first component 12. Space is allowed preventing second component 14 aft plate 16 members from contacting the aft edges 25 of the channel stock 11. Viewing FIG. 13, showing separated components 12, 14, bending forces upon the elongated channel stock 11 will produce no will effects as will hereinafter become apparent.

It is preferred that no stopping device be employed for preventing components 12, 14 from completely disengaging. The feed-out limit of the retriever cable 1 and the telescoping stabilizer/walkway extension limit will prevent inadvertently exceeding extension limits of the telescoping push/pull rod 27. It is now to be understood that the rail captured sliding stabilizer platform aft trailer bed position is limited by rail stops.

Viewing FIGS. 1 and 10, the launcher cable 4 is shown, as understood, extending aft below rollers, training about the aft pulley 26 located and secured between the roller supporting angle members 37, 37', then training about the channel member fore pulley 5, then training about the channel member aft pulley 15, the end of the cabler 4 then being secured by the mentioned retainer means 18, 17. FIG. 1 shows cables 1, 4 providing an extending and retracting push/pull rod. Tension upon the launcher cable 4 will either move the push/pull rod 27 aft, or cause second component 14 to extend from first component 12, or again, desirably, simultaneously cause both above mentioned motions to transpire. Tension upon the retriever cable 1 produces a reverse, though similar, effect.

It is important to notice that launcher/retriever cables 4, 1 have equal linear displacement when second component 14 is extending/retracting while first component 12 remains stationary. Cables 4, 1 have equal linear displacement when push/pull rod 27, all components, thereof, being stationary relative to each other, is in translational motion. During all launch and retrieve operations, the cables 1, 4 proportional linear displacements are within acceptable limits.

Figure 8:
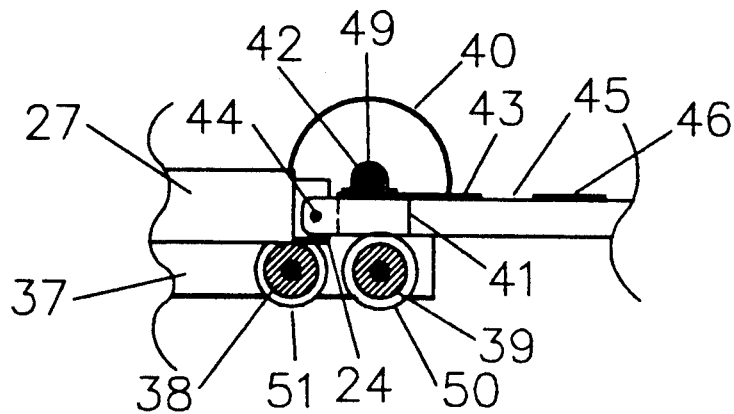
FIG. 8 depicts a partial sectional side view, similar to FIG. 7, showing the relationship of the push/pull rod and the keel support platform, together resting upon roller components.

Viewing FIGS. 6, 7, 8, 9, the boat keel support platform, having preferred elongated, rectangular, or square, tubular side support members 45, 45', is shown having fore wheels 40, 40'. Axle brackets 42, 42' are preferably welded to the plate 43 and the brackets 42, 42' rigidly maintain the heavy duty axle 49 in place. The keel support platform tubular support members 45, 45' are maintained parallel and laterally spaced apart by preferably welding longitudinally spaced-apart plates, such as plates 43, 46, the plates 43, 46 distanced to satisfy rigidity requirements, to the upper surfaces thereof. A preferred wooden platform 47 overlays the plates, the wood providing suitable protection for most vessel hulls. A hull protecting, minimal absorbent material can be placed over the wood and hull contact surfaces for increased hull protection. The push/pull rod 27 is shown resting upon the sandwiched rollers 50, 51, the push/pull rod being trapped between larger diameter rollers 38, 39. As shown in FIG. 8, keel support platform member 45 rest upon the larger diameter roller 50 as the push/pull rod 27 rest upon the smaller diameter roller 38. There are three independent rollers on each axle 48, providing means for each roller to rotate upon the axle at an independent angular velocity. Apertured plate members 41 are preferably welded underneath the plate 43 and protrude forward of the keel support platform providing means for, as previously referred to, pivotally bolting 44 the push/pull rod 27 to the keel support platform. FIG. 9 shows the wheeled keel support platform somewhat removed from the, understood trailer, aft rollers 38, 39, and having the platform shown at an angle with the push/pull rod 27. Viewing FIGS. 6, 8, the fore wheels, 40, 40' have clearance with all components associated with the roller support angle members 37, 37'.

Viewing FIG. 10, shown is a cut-away portion of the understood rail captured stabilizer platform 55 having means for attaching angled stop brackets 56, 56' to the near aft underside thereof. During launching, the laterally protruding catch bars 7, 7' cause the telescoping push/pull rod 27 to extend when the bars 7, 7' contact the brackets 56, 56'. Prior to overcoming stabilizer platform sliding friction, the telescoping push/pull rod 27 will extend. Therefore, no bending forces exist upon the telescoping push/pull rod 27 prior to having portions of the now extended push/pull rod 27 protruding from the trailer bed. The understood extension limit of the stabilizer/walkway prevents inadvertent, as referred to above, complete separation of telescoping push/pull rod components 12, 14. Also shown is the launcher cable 4 related to the understood stationary trailered pulleys 57, 54. A preferred method for having the stationary launcher cable aft pulley 54 rigidly secured in place is to weld the pulley 54 support shaft 53, as shown, to the angle members 37, 37'. Side members of the pulley 54 are also rigidly secured to the shaft 53, preferably by welding means.

Figure 14:
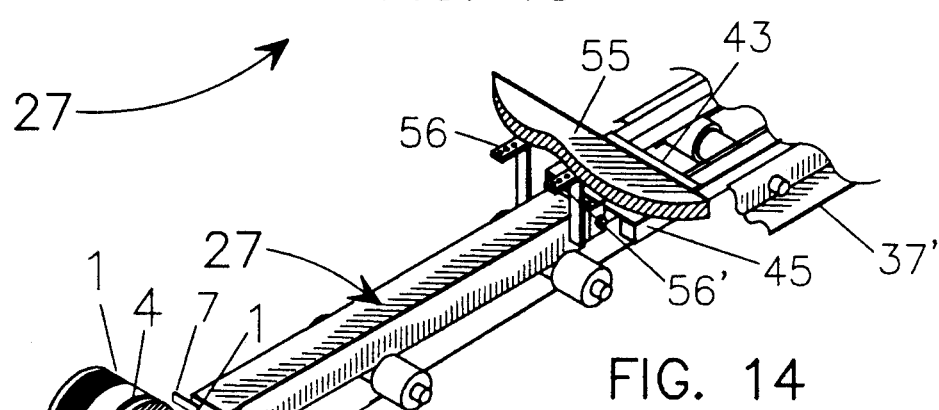
FIG. 14 depicts a partial perspective view of the relationship between the retracted telescoping push/pull rod, the drum member of a drum winch, launcher/retriever cabling, the stabilizer platform, roller supporting angle members, and the keel support platform.

Viewing FIG. 14, the telescoping push/pull rod 27 is shown related to the drum 58 of an understood reversible drum winch. The fore end of the push/pull rod 27 is very close to the drum 58. Launcher cable 4 and retriever cable 1 are shown counter wound about the drum 58 such that the retriever cable 1 approaches the center periphery of the drum during recovery of the understood launched cradle, as the launcher cable 4 approaches an outer periphery of the drum 58. Again viewing FIG. 10, the reverse is shown happening during launching.

A person skilled in the art would be able to purchase and install a choice of numerous electrical, electronic, or photo-sensitive devices that will provide means for having remote control of the understood reversible drum winch used with this invention.

Figure 15:
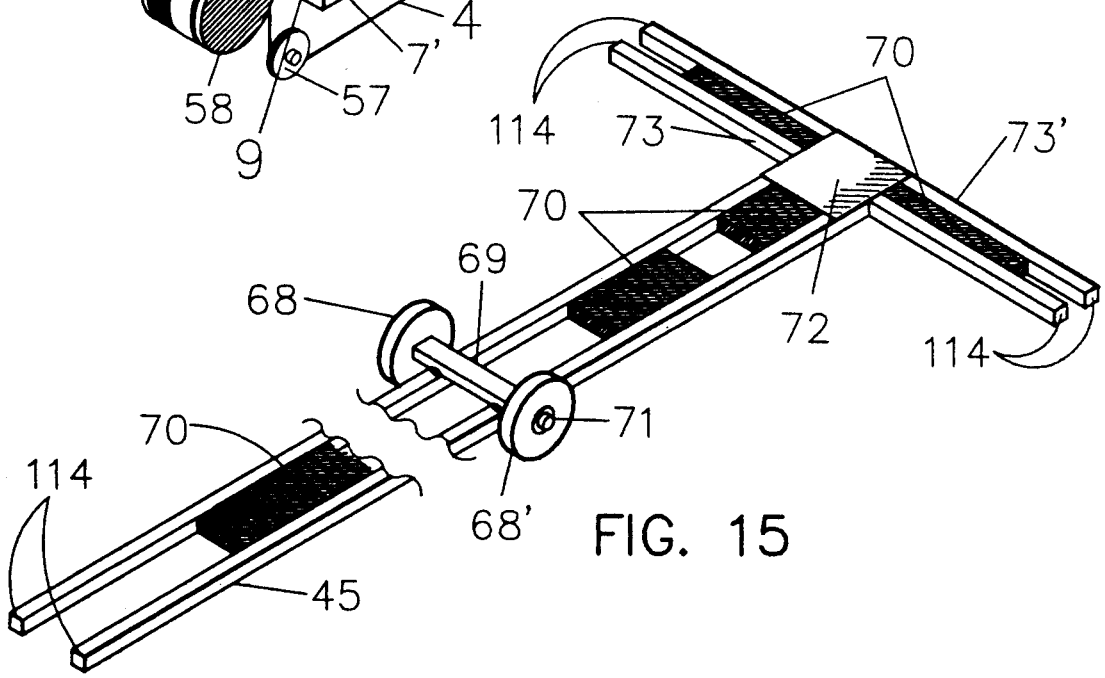
FIG. 15 depicts a partial perspective view of some preferred structural elements of the keel support platform, to include added flotation material and emphasized wheels.

Viewing FIG. 15, preferred elongated, tubular support members 45, 45', 73, 73' of the keel support platform are shown such that flotation material is installed between the parallel members. A plate 72 is shown securing the cross the tubular members 73, 73' to the parallel tubular members. Preferably, the plate 72 and contacting tubular members are welded together. The ends 114 of all tubular members are watertight, thus providing added buoyancy to the device. Also, exaggeratingly depicted, wheels 68, 68' are shown rotatingly secured to the axle 71, the heavy duty stock member 69, in union with the axle 71, is preferably welded laterally upon the upper surface of the tubular keel support platform members.

Again, because of the teachings herein, a person skilled in the art would be able to install many wheels adapted for particular keel support platforms, and construct light, to ultra heavy duty, keel support platforms.

Figure 16:
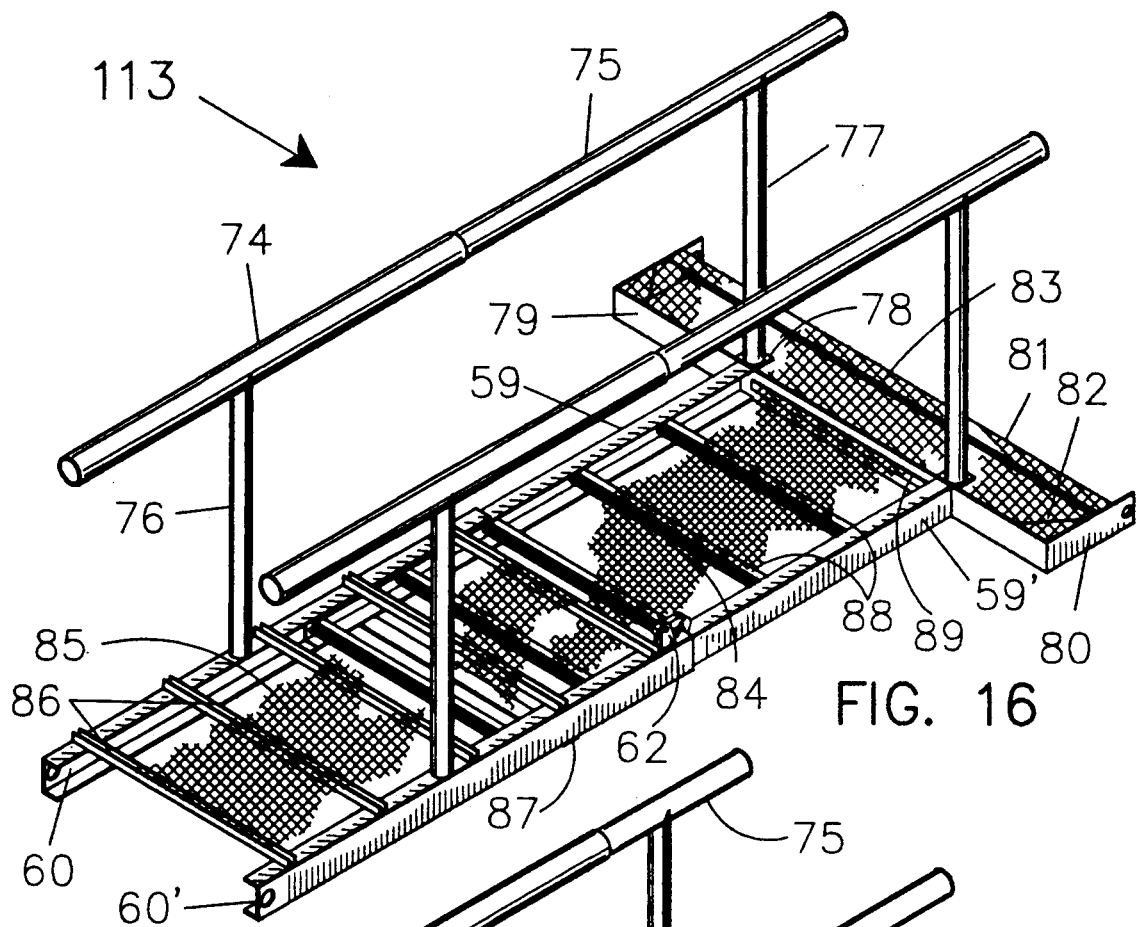
FIG. 16 depicts a perspective view of the partially extended telescoping stabilizer/walkway.
Figure 17:
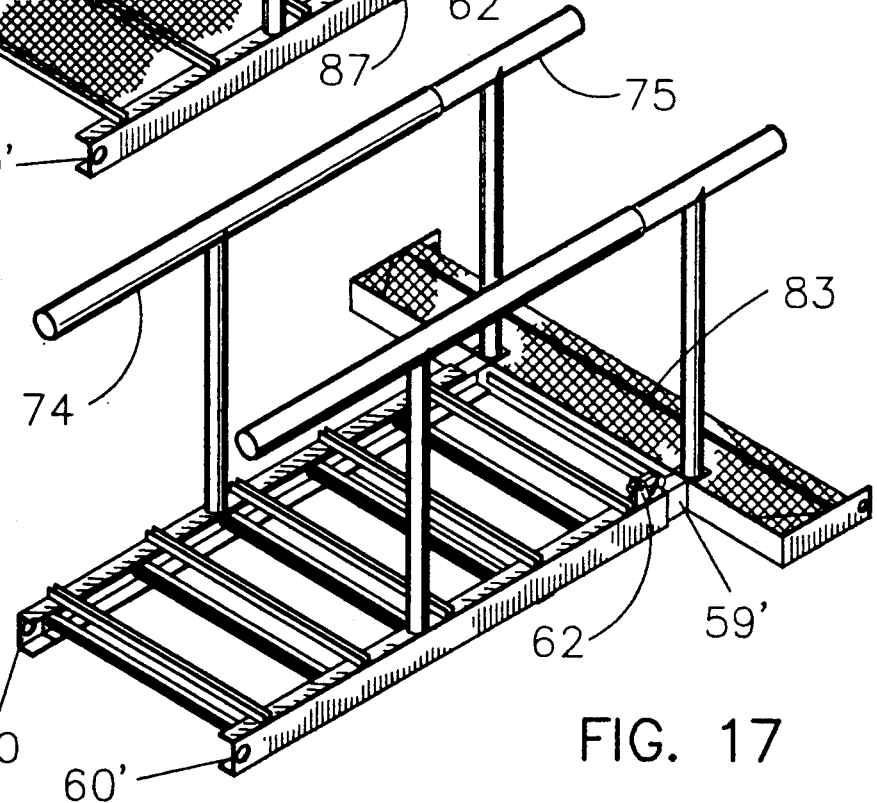
FIG. 17 is a view similar to FIG. 16 showing the stabilizer/walkway retracted.

Viewing FIGS. 16, 17, the improved telescoping stabilizer/walkway 113 is shown. The walking surfaces 85, 84, 83 are, preferably, comprised of light gage expanded metal, the porous expanded material providing a less wind resistant walkway. The primary elongated support channel members 60, 60', 59, 59' are rigidly maintained parallel, channel facing channel, and rigidly maintained laterally spaced-apart by like-kind representative lateral channel stock braces 86, 88. Increased rigidity for members 60, 60' is provided by the undersurface lateral bar brace 87. Longitudinally spaced-apart channel stock braces are welded to the upper surface of the primary channel members 60, 60'. The expanded metal surface 85 is fixedly secured upon the upper surfaces of these channel stock braces. Longitudinally spaced-apart channel stock braces are welded, vertically centered, within the channels of primary channel members 59, 59'. The expanded metal surface 84 is fixedly secured upon the upper surfaces of these channel stock braces and the upper surface of the lateral support member 89. Rigidly parallel primary channel members 59, 59' are centered upon and end welded to the bar stock member 79. Bar stock member 80 is welded at a ninety degree angle with member 79 and the corner brace 82 is welded at the corner thus formed. A like-kind corner is provided at the opposite end of the bar member 79. Elongated channel stock brace member 81 is welded laterally between the bar member 80 and the bar member 80 like-kind. A third expanded metal surface is fixedly secured upon the upper surfaces of members 79, 81. The outer surfaces of rigid parallel primary channel members 59, 59' are registrable with the inner surfaces of rigid parallel primary channel members 60, 60'. The handrail 74 and handrail 75 supports 76, 77 are welded to the registrable components, or registrable component welded members to suit and such that the outer surface of tubular hand rail 75 is registrable with the inner surface of hand rail 74. Like-kind hand rails and hand rail supports exist on the opposite side of the telescoping stabilizer/walkway. The registrable components mentioned provide a telescoping stabilizer/walkway that will extend and retract. The four apertures at the four corners of the device 113 provide means for substituting a telescoping stabilizer/walkway for a folding stabilizer/walkway. The spring operated slide lock 62 prevents the registrable, combined components of the device 113 from exceeding functional extension limits.

Viewing FIG. 11, the slide lock 62 is shown having the locking component 61 maintained, slidingly, in contact with the member 60'. The spring 65 is maintained in place by the studs 64, 63. Also shown is the slide lock 62 shaft 66 and supporting side members. Preferably, the device 62 is welded in place. FIG. 12 shows the member 60' having an angled notch 67 and rounded slide lock 61 such that the locking device 61 will slide from the notch when the telescoping stabilizer/walkway is retracting.

A person skilled in the art would be able to construct a stabilizer/walkway comprising, simultaneously, both folding and telescoping functions.

Figure 18:
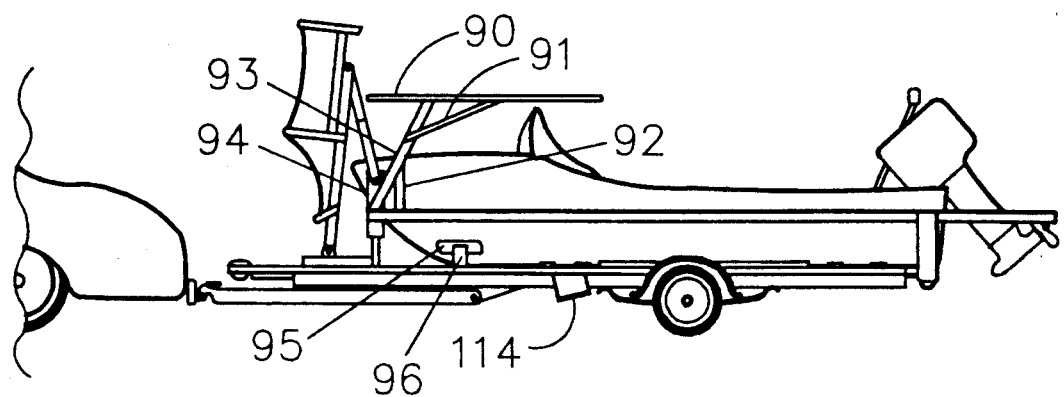
FIG. 18 depicts a plain side elevation view of a trailered launcher/retriever cradle having additional cradle attached hand rails.
Figure 19:
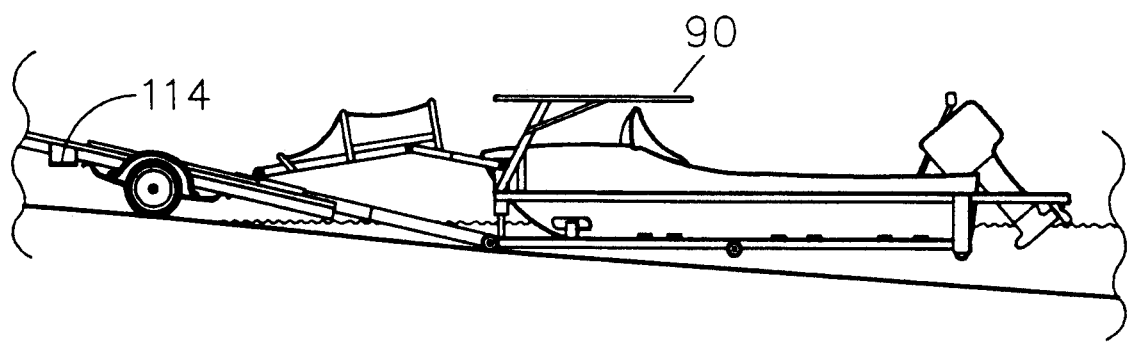
FIG. 19 depicts a plain side elevation view of the launcher/retriever boat cradle in the launched position, and, also shown are keel support platform wheels.

Viewing FIGS. 18, 19, an additional hand rail 90 is shown fixedly attached at the vessel bow end of the cradle. The diagonal support member 93 is fixedly attached to the vertical cross tee member 94, and has the brace members 92, 91 for added rigidity. An angled step 117 is shown welded to the trailer, the step 117 being horizontal, FIG. 19, when the cradle is in the launched position. Items 95, 96 comprise keel support platform mounted vessel fore keel guide/supports adapted for diverse hull designs.

Even again, a person skilled in the art could add numerous roller configurations, hull support devices and guides to the present boat keel support platform.

Figure 20:
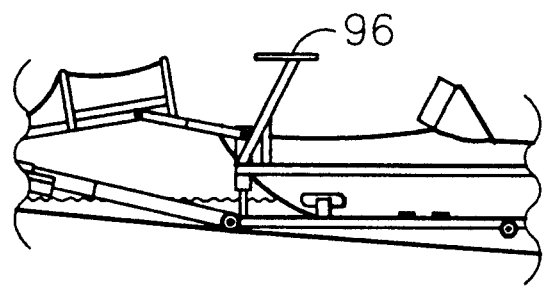
FIG. 20 depicts a plain partial side view, similar to FIG. 19, showing a hand rail for a cradled bow ridder type boat.
Figure 25:
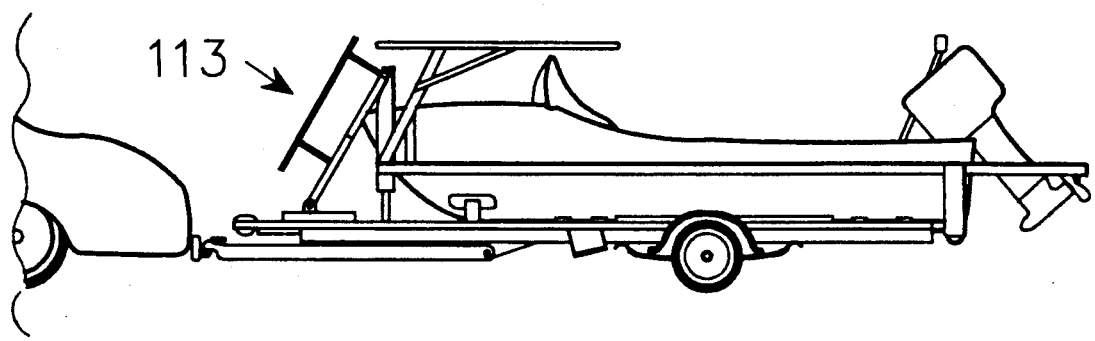
FIG. 25 depicts a plain side view of the trailered cradle having the retracted telescoping stabilizer/walkway installed.
Figure 26:
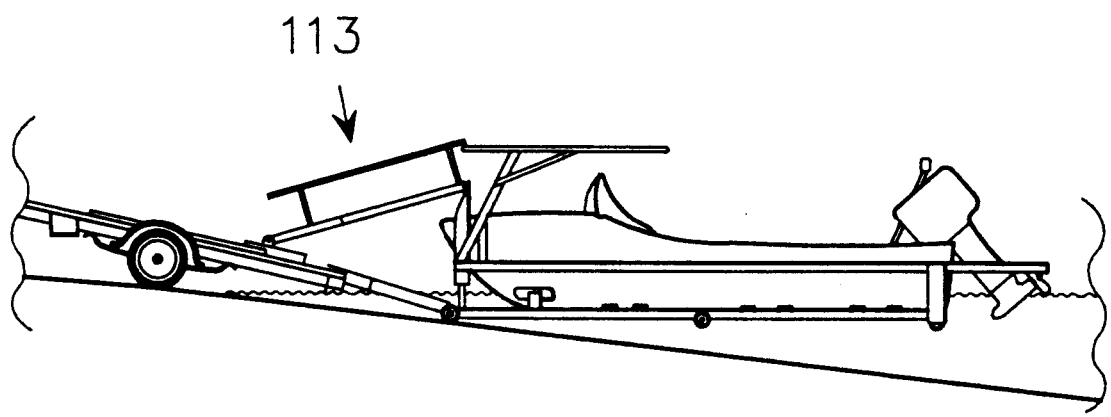
FIG. 26 depicts a plain side view of the launched cradle having the telescoping stabilizer/walkway extended.

Viewing FIG. 20, an additional hand rail, 116 similar to that shown in FIGS. 18, 19, is shown adapted for a bow rider boat.

Viewing FIG. 21, a light weight detachably secured framing 97 is placed over the cradle.

Viewing FIG. 22, a detachably secured protective covering 98 is placed over the framing of FIG. 21.

Figure 27:
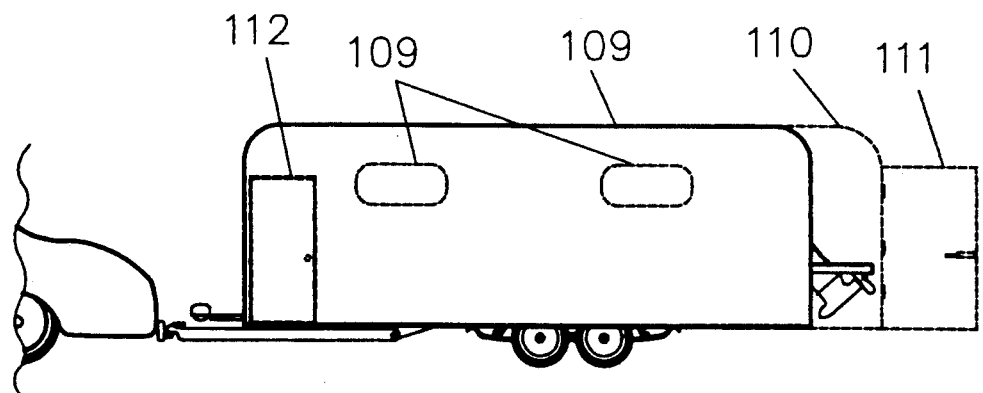
FIG. 27 depicts a plain side view of a heavy duty trailer having an enclosure for containment of the invention.

Viewing FIG. 27, means for having a protective enclosure 109 upon the combined trailer is shown, wherein the cradle is removable therefrom and receivable therein. The enclosure 109 can partially enclose the device, or completely enclose 110 the device. The enclosure has doors 112, 111 and windows 115 to suit.

Prior to the present invention, it was not practical to have an enclosure upon a boat trailer.

Viewing FIG. 23, a light weight, elongated narrow support 102, the support 102 having triangular blocks 103 fixedly attached thereto, provides means for having handy steps 99 fixedly attached at the sides of the cradle, as shown in FIG. 24. A light weight, "I" shaped, independent, handy support device 105, 106, 108 having triangular blocks 107 fixedly attached thereto, and hull protecting material 104 wrapped around the upper cross member 105 arms thereof provides means for having an easy to store, handy stepping device 100, as shown used in FIG. 24.

As a result of the foregoing teaching, many diverse and very useful innovations are possible. Directing attention to several: the device could be constructed to handle any size trailerable floating vessel, to include trailering vessels previously considered too massive for trailering; having a removable receivable floating cradle within a cradle such that vessels could transport the same and therefore be protected at dockside, or at anchor; and, because the cradle is buoyant, the railing surroundingly engaging the hull of a boat could double as a rail having a lateral member movably fore and aft thereupon providing means for attaching the bow end of a boat to a center point thereof and then pulling the vessel into the cradle, or pushing the vessel from the cradle.

"The foregoing description of the preferred embodiments of the invention have been presented for the purposes of illustration and description. It is not intended to be exhaustive or to limit the invention to the precise forms disclosed. Many modifications and variations are possible in the light of the above teaching. It is intended that the scope of the invention be limited not by this detailed description, but rather by the claims appended hereto."

I claim:

1. An improved launcher/retriever boat cradle comprising:
   a. a boat keel support platform including keel guide/support blocks;
   b. a buoyant wheeled cross tee member including boat transom support blocks and boat keel guide/support blocks, said buoyant wheeled cross tee member secured to the aft end of said boat keel support platform;
   c. angle members including rollers, said angle members including edges extending above rollers such that said boat keel support platform upon said rollers is aligned within said extending edges;
   d. a folding stabilizer pivotally secured to two vertical members of a second cross tee, said second cross tee secured to a forward vertically secured member of said boat keel support platform, said folding stabilizer also pivotally secured to a stabilizer platform, said stabilizer platform including side support members, said side support members having a slippery entrapment upon two rails, said folding stabilizer having platforms to walk upon and hand rails;
   e. a push/pull rod pivotally connected to forward end of said boat keel support platform;
   f. launcher and retriever cables counter wound on a reversible drum winch, said retriever cable via a forward pulley is attached to the free end of said push/pull rod and said launcher cable via a forward pulley and aft pulley is also attached at said free end of said push/pull rod;
   g. whereby movements of said push/pull rod, keel support platform, stabilizer and stabilizer platform are accomplished;
   h. extended railings for guiding and surroundingly engaging the hull of a boat being included with said boat keel support platform and said two cross tees; and
   i. wherein said launcher/retriever boat cradle can be combined with a trailer, wherein the improvement comprises:
   j. a telescoping push/pull rod having outer surfaces of an elongated tubular second component registrable with the inner surfaces of an elongated tubular first component, said first component having a detachably secured, apertured, fore end cover plate, said cover plate having laterally protruding catch bars, said cover plate also having an elongated channel member, an end of said channel member being welded perpendicular to the inner surface thereof, said channel member having a stop for said second component fixedly attached thereto, said channel member extending within said first component, said channel member having longitudinally spaced-apart coplanar pulleys rotatingly secured between the lateral sides thereof, said coplanar pulleys being laterally off-center, said second component having an aft end cover plate fixedly attached thereto, and apertured plates providing means for pivotally bolting a keel support platform thereto, said retriever cable extending directly from a reversible drum winch, passing through said first component cover plate aperture, extending between lateral sides of said channel member, the end thereof being fixedly attached to the inner surface of said second component aft end cover plate, said launcher cable extending from said drum winch, training about a pulley secured below said winch, extending aft below said rollers, training about an aft pulley located between said roller supporting angle members, training about said channel member coplanar pulleys, the end thereof being fixedly attached at the fore, inner top surface of said second component, providing means for having an extending and retracting said telescoping push/pull rod, said laterally protruding catch bars, during launching, coming in contact with angled stop brackets fixedly attached at an undersurface of said stabilizer platform causing said telescoping push/pull rod to extend prior to experiencing bending forces;

k. a multi-wheeled, buoyant keel support platform;

l. additional hand rails fixedly attached at the vessel bow end of said cradle;

m. an angled step fixedly attached to said combined trailer, said step being horizontal during launching of said cradle;

n. elongated narrow supports fixedly attached at sides of said cradle, said supports having stepping blocks fixedly attached thereto;

o. an "I" shaped independent support device having fixedly attached blocks to step upon and having hull protecting material wrapped around upper cross member arms thereof;

p. a forward keel/hull alignment guide fixedly attached to said keel support platform, said guide conforming to the shape of particular hull designs; and q. hull protecting material upon vessel contact surfaces of said cradle.

2. An improved launcher/retriever boat cradle comprising:

a. a boat keel support platform including keel guide/support blocks;

b. a buoyant wheel cross tee member including boat transom support blocks and boat keel guide/support blocks, said buoyant wheeled cross tee member secured to the aft end of said boat keel support platform;

c. angle members including rollers, said angle members including edges extending above rollers such that said boat keel support platform upon said rollers is aligned within said extending edges;

d. a folding stabilizer pivotally secured to two vertical members of a second cross tee, said second cross tee secured to a forward vertically secured member of said boat keel support platform, said folding stabilizer also pivotally secured to a stabilizer platform, said stabilizer platform including side support members, said side support members having a slippery entrapment upon two rails, said folding stabilizer having platforms to walk upon and hand rails;

e. a push/pull rod pivotally connected to forward end of said boat keel support platform;

f. launcher and retriever cables counter wound on a reversible drum winch, said retriever cable via a forward pulley is attached to the free end of said push/pull rod and said launcher cable via a forward pulley and aft pulley is also attached at said free end of said push/pull rod;

g. whereby movements of said push/pull rod, keel support platform, stabilizer and stabilizer platform are accomplished;

h. extended railings for guiding and surroundingly engaging the hull of a boat being included with said boat keel support platform and said two cross tees; and i. wherein said launcher/retriever boat cradle can be combined with a trailer, wherein the improvement comprises:

j. a telescoping push/pull rod having registrable first and second components, said first component having an apertured fore end cover plate detachably secured thereto, said plate having an end of an elongated channel member welded perpendicular to the inner surface thereof, said channel member having longitudinally spaced-apart coplanar pulleys rotatingly secured between the lateral sides thereof, said second component having an aft end cover plate fixedly attached thereto, said second component having apertured plates fixedly attached thereto, said plate providing means for pivotally bolting said multi-wheeled keel support platform to said second component, said retriever cable extending from a reversible drum winch, passing through said first component cover plate aperture, extending between lateral sides of said channel member, the end thereof being fixedly attached to said second component, said launcher cable extending from said drum winch, training about a pulley secured below said winch, extending aft below said rollers, training about an aft pulley located between said roller supporting angle members, training about said channel member coplanar pulleys, the end thereof being fixed attached to said second component;

k. a multi-wheeled, buoyant keel support platform;

l. laterally protruding catch bars fixedly attached at the fore end of said telescoping push/pull rod, said catch bars, during launching, contacting catch bar stop brackets, said stop brackets being fixedly attached at the aft undersurface of said stabilizer platform;

m. additional hand rails fixedly attached at the vessel bow end of said cradle; and n. a keel/hull alignment guide fixedly attached at a forward position upon said keel support platform.

3. The improved launcher/retriever boat cradle of claim 2 having hull protecting material upon hull contact surfaces of said cradle.

4. The improved launcher/retriever boat cradle of claim 2 wherein an angled step is fixedly attached to said combined trailer.

5. The improved launcher/retriever boat cradle of claim 2 wherein elongated narrow supports are fixedly attached at sides of said cradle, said supports having stepping blocks fixedly attached thereto.

6. The improved launcher/retriever boat cradle of claim 2 having an independent, light weight, "I" shaped, support device, said device having stepping blocks fixedly attached thereto, said device having vessel hull protecting material upon the upper cross member arms thereof.

7. The improved launcher/retriever boat cradle of claim 2, wherein a telescoping stabilizer is substituted for said folding stabilizer, said telescoping stabilizer having first channel members rigidly maintained by fixedly attached longitudinally spaced-apart lateral braces along the upper surfaces thereof, said braces having a walking surface fixedly attached thereupon, second channel members rigidly maintained by fixedly attached lateral braces longitudinally spaced-apart and centered along and within the channels thereof, said second channel members' braces having a walking surface fixedly attached thereupon, a cross tee member fixedly attached at the ends of said second channel members and having a walking surface fixedly attached thereupon, said first and second channel members being registrable and having a spring loaded lock limiting the extension of said registrable first and second channel members.

8. An improved launcher/retriever boat cradle comprising:
 a. a boat keel support platform including keel guide/support blocks;
 b. a buoyant wheeled cross tee member including boat transom support blocks and boat keel guide/support blocks, said buoyant wheeled cross tee member secured to the aft end of said boat keel support platform;
 c. angle members including rollers, said angle members including edges extending above rollers such that said boat keel support platform upon said rollers is aligned within said extending edges;
 d. a folding stabilizer pivotally secured to two vertical members of a second cross tee, said second cross tee secured to a forward vertically secured member of said boat keel support platform, said folding stabilizer also pivotally secured to a stabilizer platform, said stabilizer platform including side support members, said side support members having a slippery entrapment upon two rails, said folding stabilizer having platforms to walk upon and hand rails;
 e. a push/pull rod pivotally connected to forward end of said boat keel support platform;
 f. launcher and retriever cables counter wound on a reversible drum winch, said retriever cable via a forward pulley is attached to the free end of said push/pull rod and said launcher cable via a forward pulley and aft pulley is also attached at said free end of said push/pull rod;
 g. whereby movements of said push/pull rod, keel support platform, stabilizer and stabilizer platform are accomplished;
 h. extended railings for guiding and surroundingly engaging the hull of a boat being included with said boat keel support platform and said two cross tees; and
 i. wherein said launcher/retriever boat cradle can be combined with a trailer, wherein the improvement comprises:
 j. a multi-wheeled, buoyant keel support platform;
 k. additional hand rails fixedly attached at the vessel bow end of said cradle;
 l. an angled step fixedly attached to said combined trailer;
 m. supports fixedly attached at sides of said cradle, said supports having stepping blocks fixedly attached thereto;
 n. a forward keel/hull alignment guide fixedly attached to said multi-wheeled keel support platform, said guide conforming to the shape of particular hull designs;
 o. hull protecting material upon vessel contact surfaces of said cradle; and
 p. a telescoping push/pull rod having outer surfaces of a second component registrable with the inner surfaces of a first component, said first component having an apertured fare end cover plate, an end of an elongated channel member being welded perpendicular to the inner surface thereof, said channel member having a stop for said second component member fixedly attached thereto, said channel member having longitudinally spaced-apart coplanar pulleys rotatingly secured between the lateral sides thereof, said second component having an aft and cover plate fixedly attached thereto, said second component having apertured plates fixedly attached thereto, said plates providing means for pivotally bolting said multi-wheeled keel support platform to said second component, said retriever cable extending directly from a reversible drum winch, passing through said first component cover plate aperture, extending between lateral sides of said channel member, the end thereof being fixedly attached to said second component, said launcher cable extending from said drum winch, training about a pulley secured below said winch, extending aft below said rollers, training about an aft pulley located between said roller supporting angle members, training about said channel member coplanar pulleys, the end thereof being fixedly attached to said second component.

9. The improved launcher/retriever boat cradle of claim 8, wherein catch bars fixedly attached to said first component, during launching, contact stop brackets fixedly attached at an undersurface of said stabilizer platform causing said telescoping push/pull rod to extend prior to experiencing bending forces.

10. The improved launcher/retriever boat cradle of claim 1, wherein framing and vessel protecting covering means are placed over said cradle.

11. The improved launcher/retriever boat cradle of claim 1, wherein vessel protecting enclosure means is placed over said combined trailer 12. The improved launcher/retriever boat cradle of claim 2, wherein framing and vessel protecting covering means are placed over said cradle.

13. The improved launcher/retriever boat cradle of claim 2, wherein vessel protecting enclosure means is placed over said combined trailer.

* * * * *